United States Patent
Chen

(10) Patent No.: US 10,413,973 B2
(45) Date of Patent: Sep. 17, 2019

(54) LOCKING DEVICE

(71) Applicant: CHUAN YOUNG PRECISION INDUSTRIES CO., LTD., Taichung (TW)

(72) Inventor: Tsang-Hui Chen, Taichung (TW)

(73) Assignee: CHUAN YOUNG PRECISION INDUSTRIES CO., LTD., Taichung (TW)

( * ) Notice: Subject to any disclaimer, the term of this patent is extended or adjusted under 35 U.S.C. 154(b) by 17 days.

(21) Appl. No.: 15/872,569

(22) Filed: Jan. 16, 2018

(65) Prior Publication Data
US 2019/0217401 A1    Jul. 18, 2019

(51) Int. Cl.
*B23B 31/107*    (2006.01)
*B23B 31/22*    (2006.01)
*B23B 31/117*    (2006.01)

(52) U.S. Cl.
CPC ........... *B23B 31/223* (2013.01); *B23B 31/117* (2013.01); *B23B 2260/116* (2013.01); *Y10S 279/903* (2013.01); *Y10T 279/17717* (2015.01); *Y10T 279/17803* (2015.01)

(58) Field of Classification Search
CPC ............. B23B 31/223; B23B 2260/116; B23B 2260/02; B23B 31/1072; B23Q 1/5406; Y10T 279/17717; Y10T 279/17726; Y10T 279/17803; Y10S 279/903
See application file for complete search history.

(56) References Cited

U.S. PATENT DOCUMENTS

| | | | | |
|---|---|---|---|---|
| 2,603,496 | A * | 7/1952 | Richert | F16D 15/00 192/44 |
| 5,067,598 | A * | 11/1991 | Ritter | F16D 41/073 192/223 |
| 6,811,160 | B2 * | 11/2004 | Canela Vinas | B23B 31/223 279/71 |
| 2007/0296162 | A1 * | 12/2007 | Guy | B23B 31/1177 279/9.1 |

FOREIGN PATENT DOCUMENTS

JP    2000326115 A  *  11/2000   ......... B23B 31/1177

* cited by examiner

*Primary Examiner* — Sunil K Singh
*Assistant Examiner* — Paul M Janeski
(74) *Attorney, Agent, or Firm* — Withrow & Terranova, P.L.L.C.; Vincent K. Gustafson

(57) ABSTRACT

A locking device has a collar body, a roller cage, multiple rollers, and a clamping set. The collar body has a chamber formed inside the collar body and multiple concave recesses formed in an inner periphery of the collar body. The roller cage is mounted in the chamber. The clamping set has multiple clamping blocks annularly disposed within the roller cage. Each one of the multiple clamping blocks is curved and has multiple second concave recesses formed in an outer peripheral surface of the clamping block. The multiple rollers are rotatably mounted to the roller cage and are respectively received by the multiple first concave recesses and the multiple second concave recesses. Each one of the multiple rollers is rotatable along a corresponding one of the multiple first concave recesses and a corresponding one of the multiple second concave recesses.

17 Claims, 8 Drawing Sheets

őLOCKING DEVICE

BACKGROUND

Technical Field

The present invention relates to a locking device, and more particularly to a locking device that is able to firmly tighten objects.

Description of Related Art

A locking device is utilized to tighten or loosen a fastener that is mounted to an object and is applied to fixtures such as a tool holder tightening fixture or a wrench. A conventional locking device adopts a keyway to engage the object or clamps the object by abutting. The conventional locking device assembled to a tool holder fixture has a frame, a collar body, a needle roller cage, multiple needle rollers, and a blocking plate. The collar body is mounted to the frame and has an inner peripheral surface defined in multiple concave recesses. The needle roller cage has multiple slots. The multiple needle rollers are respectively retained in the multiple slots and are respectively disposed according to the multiple concave recesses. The blocking plate is fastened to the collar body for retaining the needle roller cage and the multiple needle rollers inside the collar body.

When a tool holder is inserted into the collar body, the multiple needle rollers are abutted by the tool holder and are respectively pushed toward the multiple concave recesses. Then, the multiple needle rollers respectively abut against the multiple concave recesses, are clamped between the collar body and the tool holder, and are unable to rotate.

The conventional locking device locks the tool holder by the multiple needle rollers that are unable to rotate. However, each one of the multiple needle rollers contacts the tool holder in linear contact with a limited contact area. Therefore, the tool holder is very likely to shake in the collar body and cannot be firmly held by the conventional locking device.

To overcome the shortcomings of the conventional locking device, the present invention provides a locking device to mitigate or obviate the aforementioned problems.

SUMMARY

The main objective of the present invention is to provide a locking device that can firmly hold and tighten an object.

The locking device comprises a collar body, a roller cage, multiple rollers, and a clamping set. The collar body has a chamber formed inside the collar body and multiple concave recesses formed in an inner periphery of the collar body. The roller cage is mounted in the chamber. The clamping set has multiple clamping blocks annularly disposed within the roller cage. Each one of the multiple clamping blocks is curved and has multiple second concave recesses formed in an outer peripheral surface of the clamping block. The multiple rollers are rotatably mounted to the roller cage and are respectively received by the multiple first concave recesses and the multiple second concave recesses. Each one of the multiple rollers is rotatable along a corresponding one of the multiple first concave recesses and a corresponding one of the multiple second concave recesses.

Other objects, advantages, and novel features of the invention will become more apparent from the following detailed description when taken in conjunction with the accompanying drawings.

DETAILED DESCRIPTION OF PREFERRED EMBODIMENTS

Figure 1:
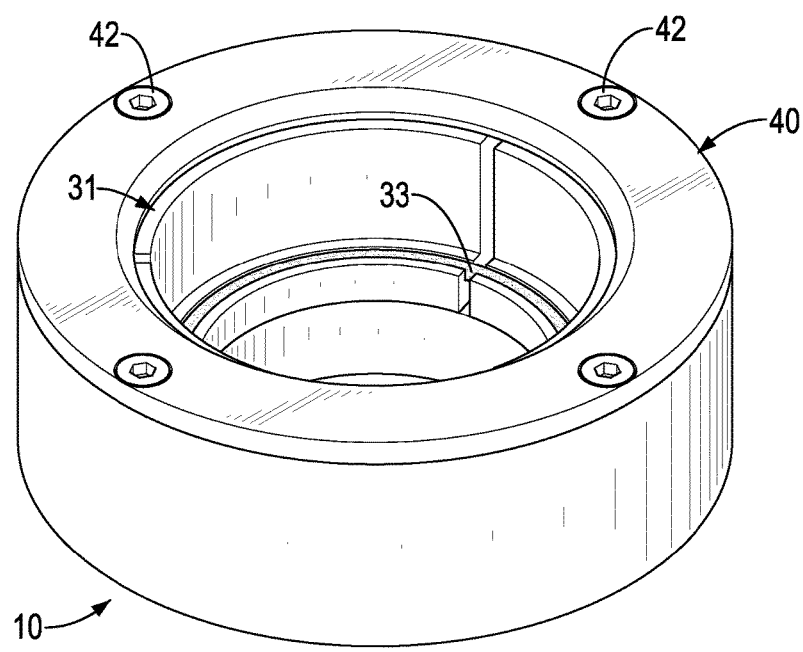
FIG. 1 is a perspective view of a locking device in accordance with one embodiment of the present invention.
Figure 2:
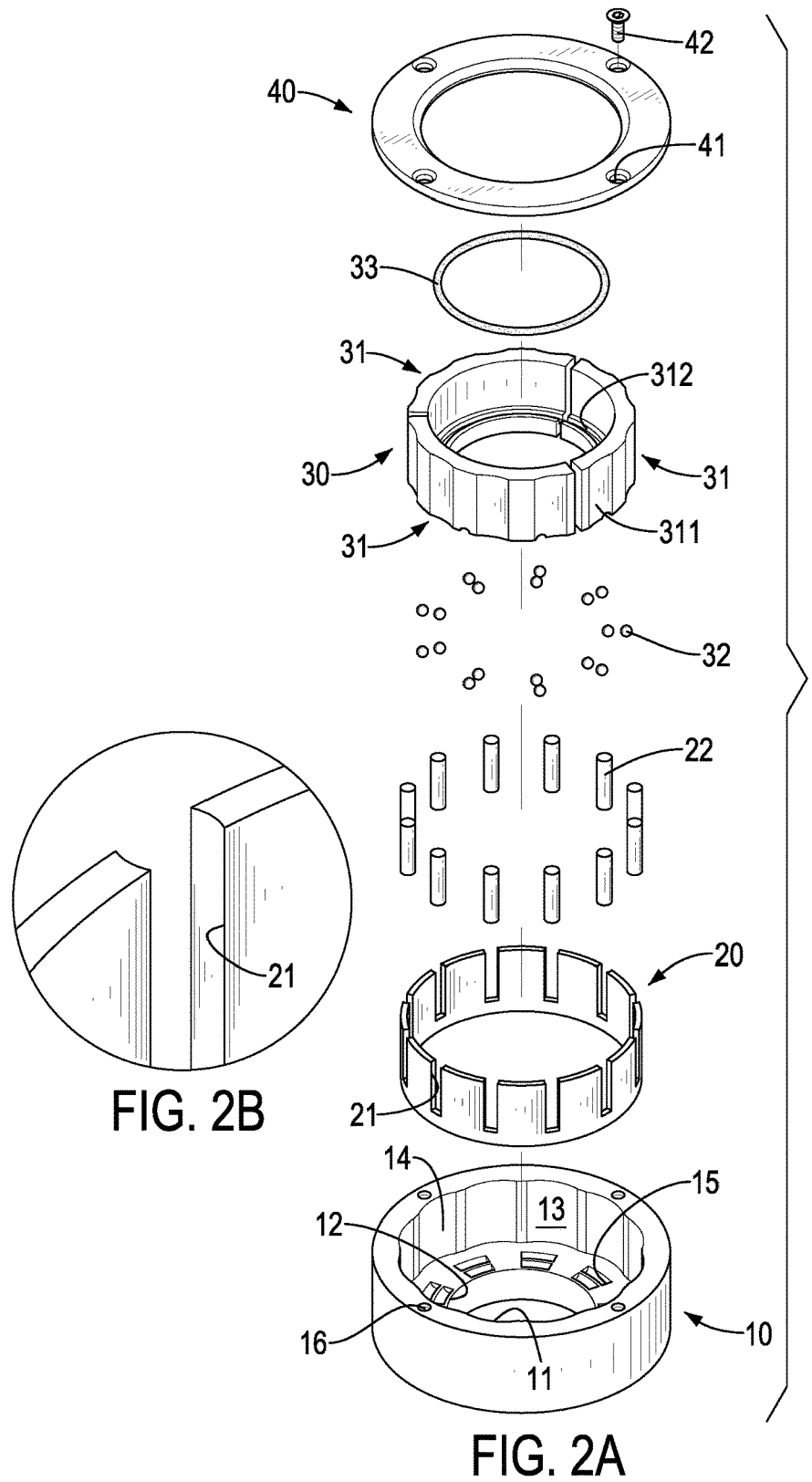
FIG. 2A is an exploded perspective view of the locking device in FIG. 1.
FIG. 2B is a partially enlarged perspective view of a roller cage of the locking device in FIG. 2A.
Figure 3:
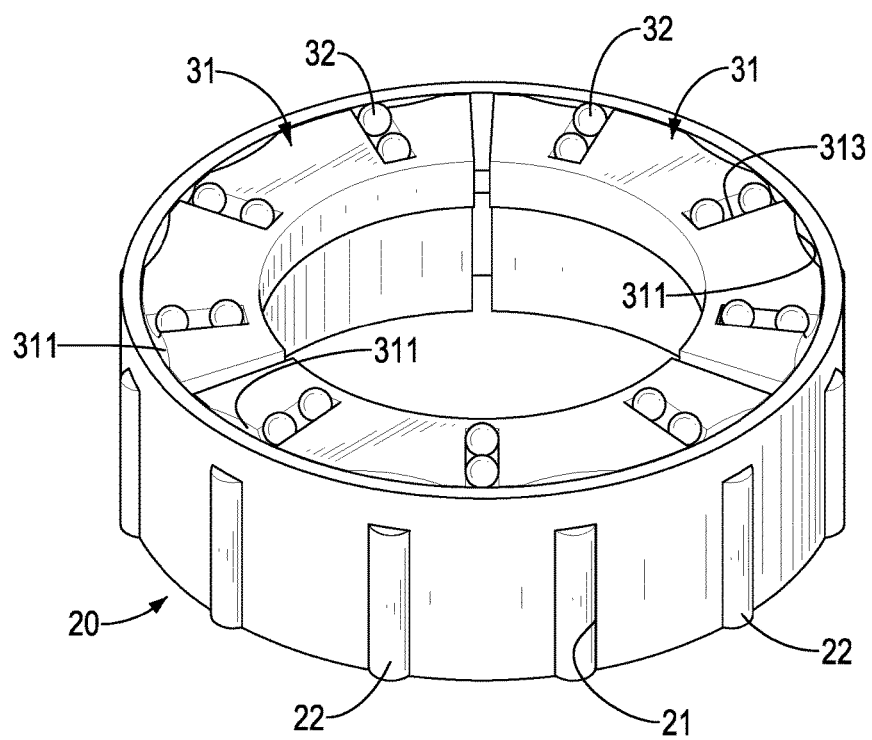
FIG. 3 is another perspective view of the locking device in FIG. 1.
Figure 4:
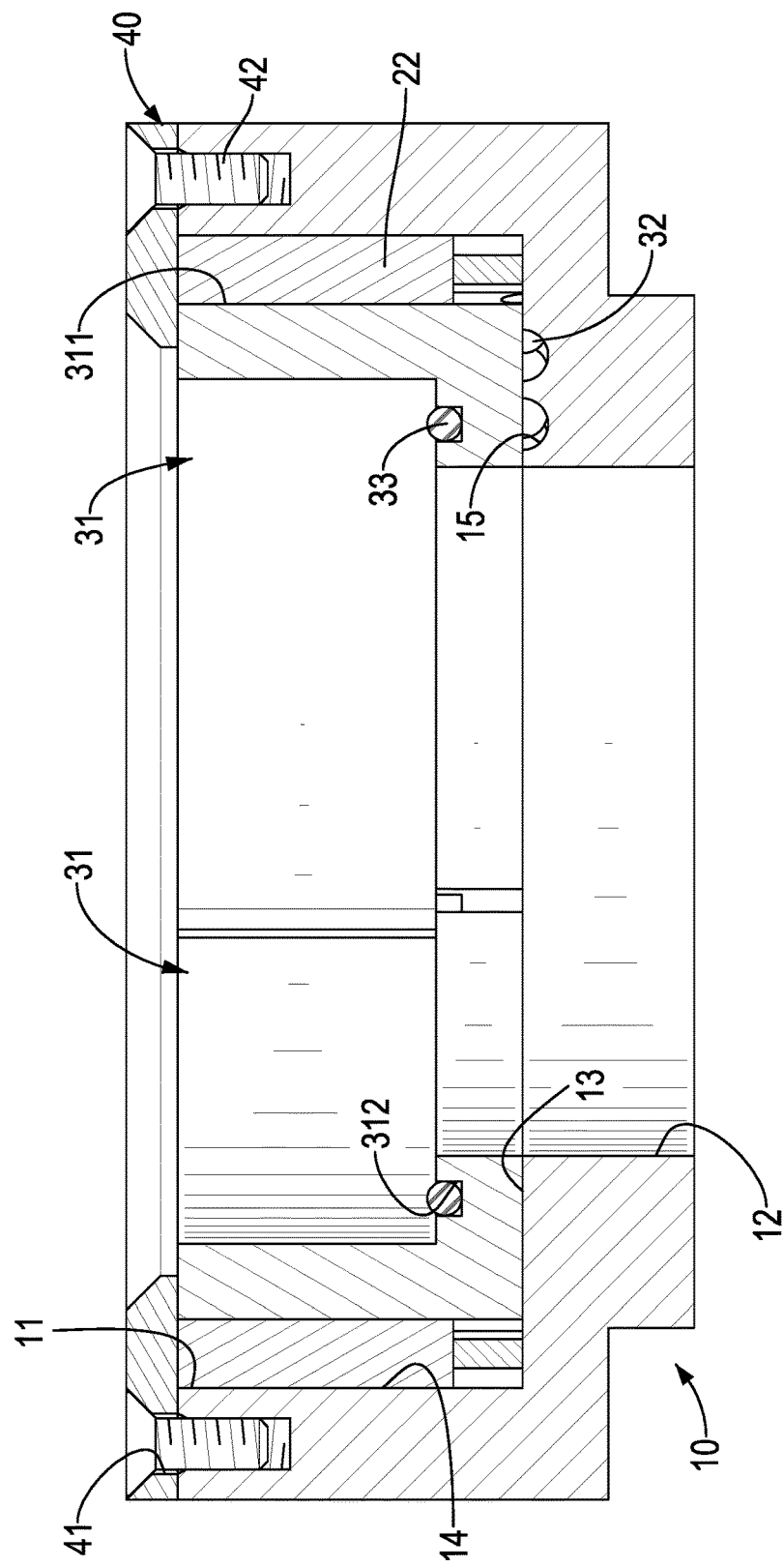
FIG. 4 is a side view in partial section of the locking device in FIG. 1.

With reference to FIGS. 1 to 4, a locking device in accordance with an embodiment of the present invention has a collar body 10, a roller cage 20, multiple rollers 22, a clamping set 30, and a blocking plate 40.

The collar body 10 is a circular mount and has two faces, an inner periphery, a mounting opening 11, an inserting opening 12, a chamber 13, multiple first concave recesses 14, and multiple guiding grooves 15. The two faces of the collar body 10 face to opposite directions. The mounting opening 11 is defined in one of the two faces of the collar body 10. The inserting opening 12 is defined in the other one of the two faces of the collar body 10. The inserting opening 12 and the mounting opening 11 are coaxially aligned with each other. The chamber 13 is formed inside the collar body 10. The chamber 13 communicates with the mounting opening 11 and the inserting opening 12. The multiple first concave recesses 14 are formed in the inner periphery of the collar body 10. The multiple first concave recesses 14 make the mounting opening 11 have a corrugated outline.

The multiple guiding grooves 15 are multiple first curved grooves and multiple second curved grooves. The multiple first curved grooves are annularly and separately disposed around the inserting opening 12. The multiple first curved grooves communicate with the chamber 13. The multiple second curved grooves are annularly and separately disposed around the inserting opening 12 as well. The multiple second curved grooves surround the multiple first curved grooves, are disposed aside the multiple first curved grooves, and are disposed between the first curved grooves and the inner periphery of the collar body 10. Multiple threaded holes 16 are formed in one of the two faces of the collar body 10 and are disposed around the mounting opening 11.

The roller cage 20 is mounted in the chamber 13 via the mounting opening 11. The roller cage 20 is circular and has an axial direction and multiple slots 21 respectively aligned with the multiple first concave recesses 14. Each one of the multiple slots 21 has a notch disposed toward the mounting opening 11 and two concavities extending along the axial direction of the roller cage 20 and facing each other. The multiple rollers 22 are respectively and rotatably mounted in the multiple slots 21, and respectively abut against the multiple first concave recesses 14. Each one of the multiple rollers 22 is retained by the two concavities of a corresponding one of the multiple slots 21.

The clamping set 30 is mounted in the chamber 13 and within the roller cage 20. The clamping set 30 has multiple blocks 31, multiple balls 32, and an O-ring 33. The multiple clamping blocks 31 are annularly disposed within the roller cage 20. Each one of the multiple clamping blocks 31 is curved and has multiple radial directions, an outer peripheral surface, an inner peripheral surface, an inner flange, multiple second concave recesses 311, a receiving groove 312, and multiple radial grooves 313. The outer peripheral surface and inner peripheral surface of each one of the multiple clamping blocks 31 face opposite each other. Multiple outer peripheral surfaces of the multiple clamping blocks 31 face to the inner periphery of the collar body 10. The inner flange of each one of the multiple clamping blocks 31 protrudes inward from the inner peripheral surface of the clamping block 31 and is disposed adjacent to the inserting opening 12. The receiving groove 312 of each one of the multiple clamping blocks 31 is formed in the inner flange of the clamping block 31, is curved, and faces to the mounting opening 11. Multiple receiving grooves 312 of the multiple clamping blocks 31 are disposed annularly. The multiple radial grooves 313 of each one of the multiple clamping blocks 31 respectively extend along the multiple radial directions of the clamping block 31. The multiple balls 32 are multiple first balls and multiple second balls. The multiple first balls are rotatably and respectively received in the multiple first curved grooves and the multiple radial grooves 313 of the multiple clamping blocks 31. The multiple second balls are rotatably and respectively received in the multiple second curved grooves and the multiple radial grooves 313 of the multiple clamping blocks 31. The O-ring 33 is received in the multiple receiving grooves 312 of the multiple clamping blocks 31.

The blocking plate 40 is annular and is fastened to the collar body 10 to retain the roller cage 20, the multiple rollers 22, and the clamping set 30 inside the collar body 10. The blocking plate 40 has multiple through holes 41 defined through the blocking plate 40. Multiple bolts 42 respectively pass through the multiple through holes 41 and are respectively screwed with the multiple threaded holes 16 to connect both the blocking plate 40 and the collar body 10.

Figure 5:
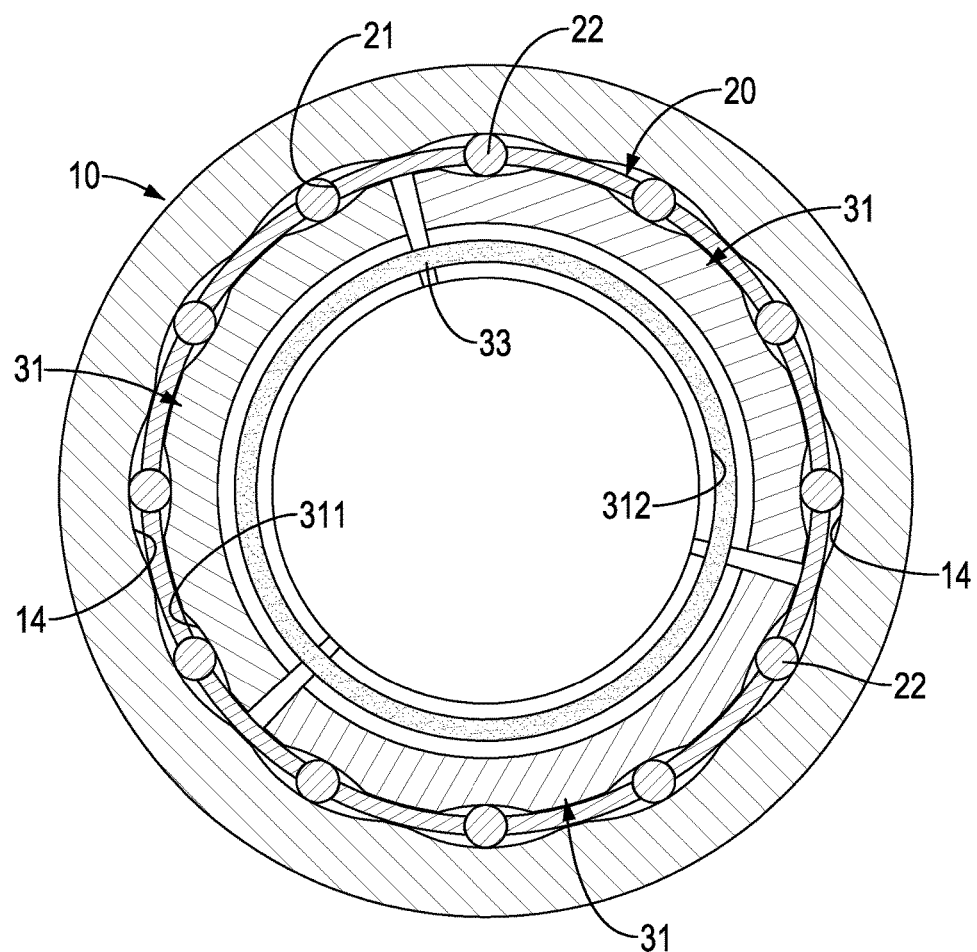
FIG. 5 is a cross-sectional top side view of the locking device in FIG. 1.
Figure 6:
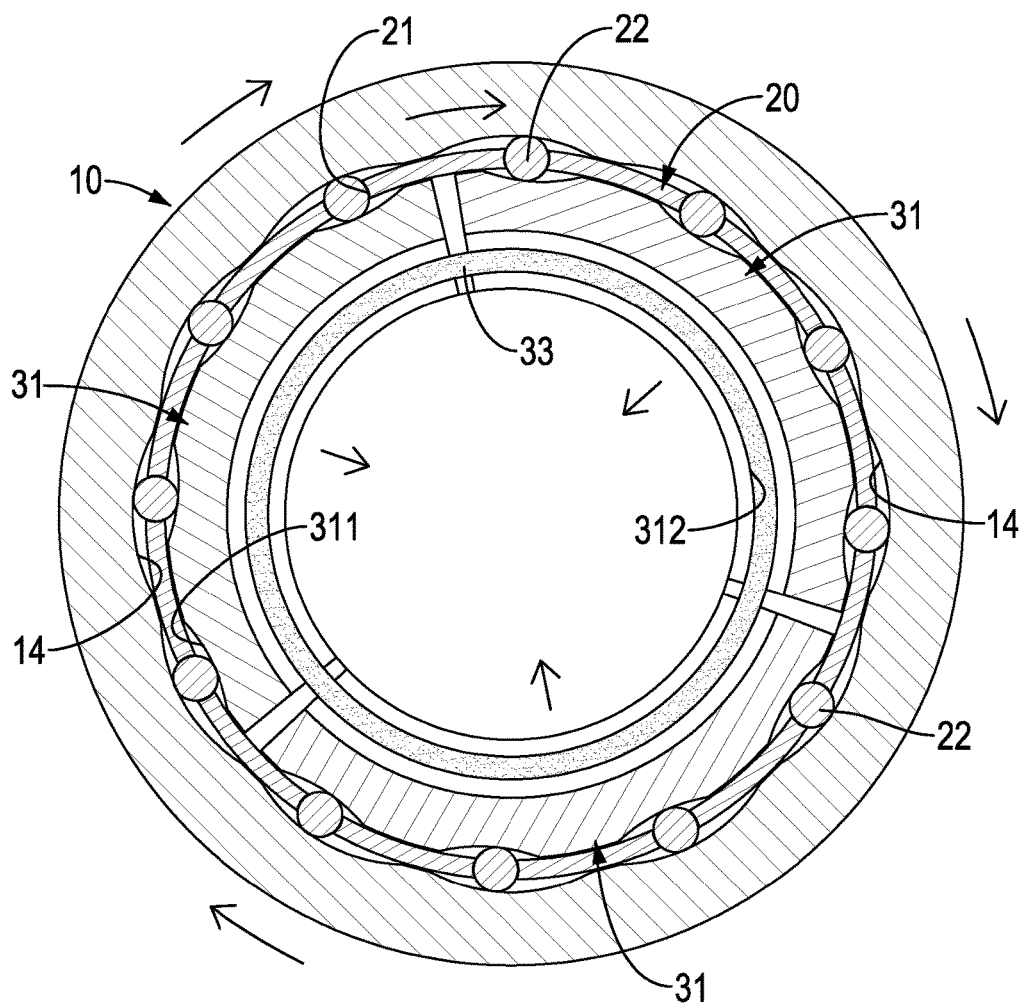
FIG. 6 is a schematic cross sectional top side view of the locking device in FIG. 1.

With reference to FIGS. 5 and 6, an object such as a tool holder is mounted through the blocking plate 40, the mounting opening 11, the chamber 13, and the multiple clamping blocks 31, and then passes out of the inserting hole 12. The object abuts against the multiple clamping blocks 31. Since each one of the multiple clamping blocks 31 is a curved block, a contact area between the object and each one of multiple clamping blocks 31 increases, and a friction between the object and each one of the multiple clamping blocks 31 increases accordingly. The multiple clamping blocks 31 abutted by the object are pushed toward the multiple first concave recesses 14, and the multiple rollers 22 are respectively clamped by the multiple first concave recesses 14 and the multiple second concave recesses 311. The multiple clamping blocks 31 are moveable toward or away from the multiple first concave recesses 14 via the multiple first balls and the multiple second balls received in the multiple radial grooves 313.

When the object is tightened by a fastener, the object rotates relative to the collar body 10, and the multiple clamping blocks 31 rotate with the object. The multiple clamping blocks 31 rotate around the inserting opening 12 via the multiple first balls received in the multiple first curved grooves and the multiple second balls received in the multiple second curved grooves.

Each one of the multiple rollers 22 rotates and moves between a corresponding one of the multiple first concave recesses 14 and a corresponding one of the multiple second concave recesses 311 of the multiple clamping blocks 31. Finally, each roller 22 gets stuck between the corresponding first concave recess 14 and the corresponding second concave recess 311 and is unable to rotate and move. Therefore, the object and the multiple clamping blocks 31 are unable to rotate relative to the collar body 10, and the object is firmly held by the locking device in accordance with the present invention.

Compared to the conventional locking device that abuts the object by multiple needle rollers, the locking device in accordance with the present invention abuts the object by the multiple clamping blocks 31, thereby increasing the contact area and the friction between the object and each one of the multiple clamping blocks 31. Moreover, each one of the multiple rollers 22 gets stuck between a corresponding one of the multiple first concave recesses 14 and a corresponding one of the multiple second concave recesses 311 of the multiple clamping blocks 31. By means mentioned above, the locking device in accordance with the present invention can firmly hold the object when tightening the fastener mounted to the object. The locking device in accordance with the present invention makes sure that a tool is securely mounted to the object and improves the machining quality.

The multiple first balls received in the multiple first curved grooves and the multiple second balls received in the multiple second curved grooves guide the multiple clamping blocks 31 and facilitate the multiple clamping blocks 31 to smoothly rotate around the inserting opening 12.

Figure 7:
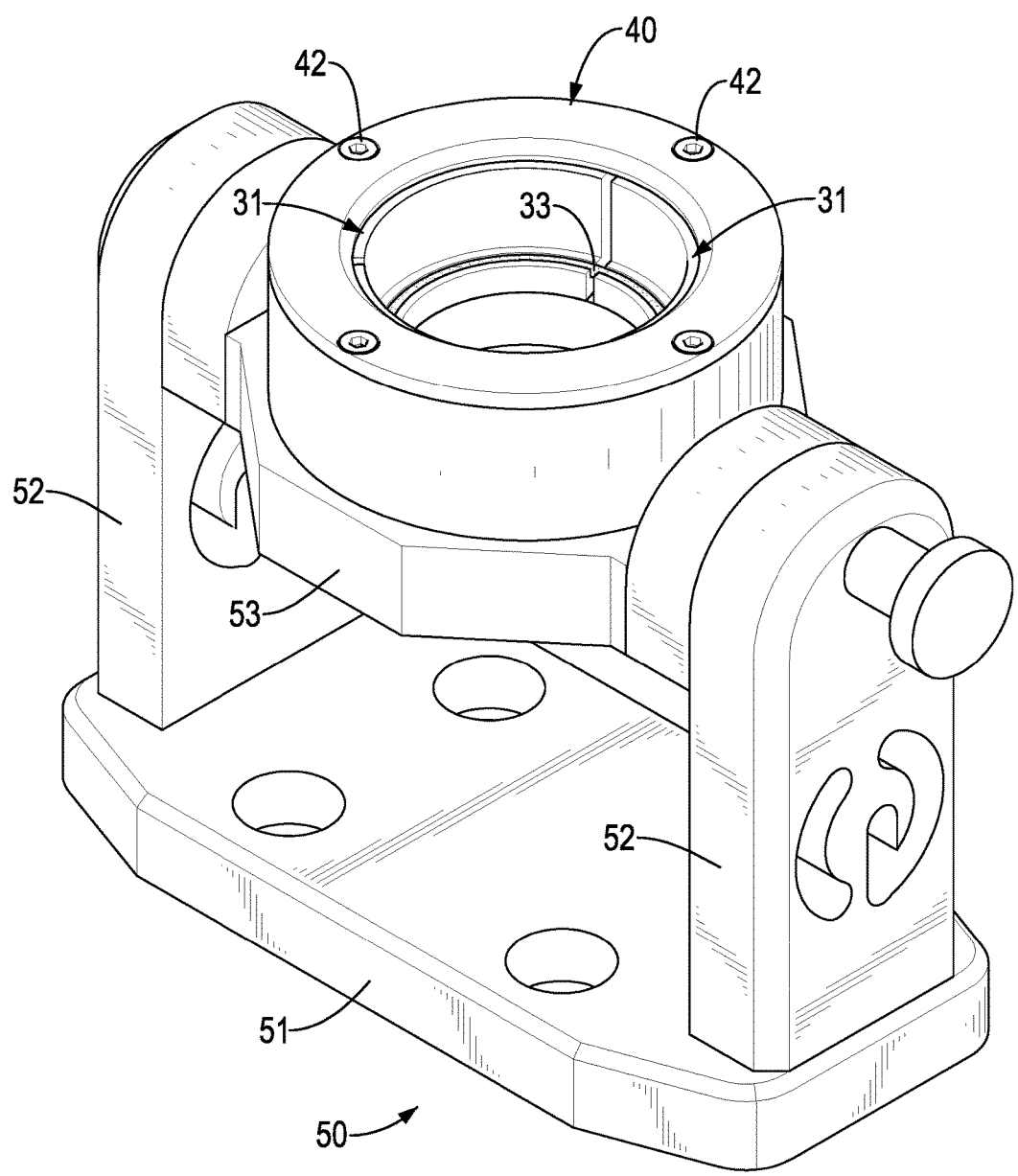
FIG. 7 is a schematic perspective view of the locking device in FIG. 1, showing the locking device assembled to a frame of a tool holder tightening fixture.
Figure 8:
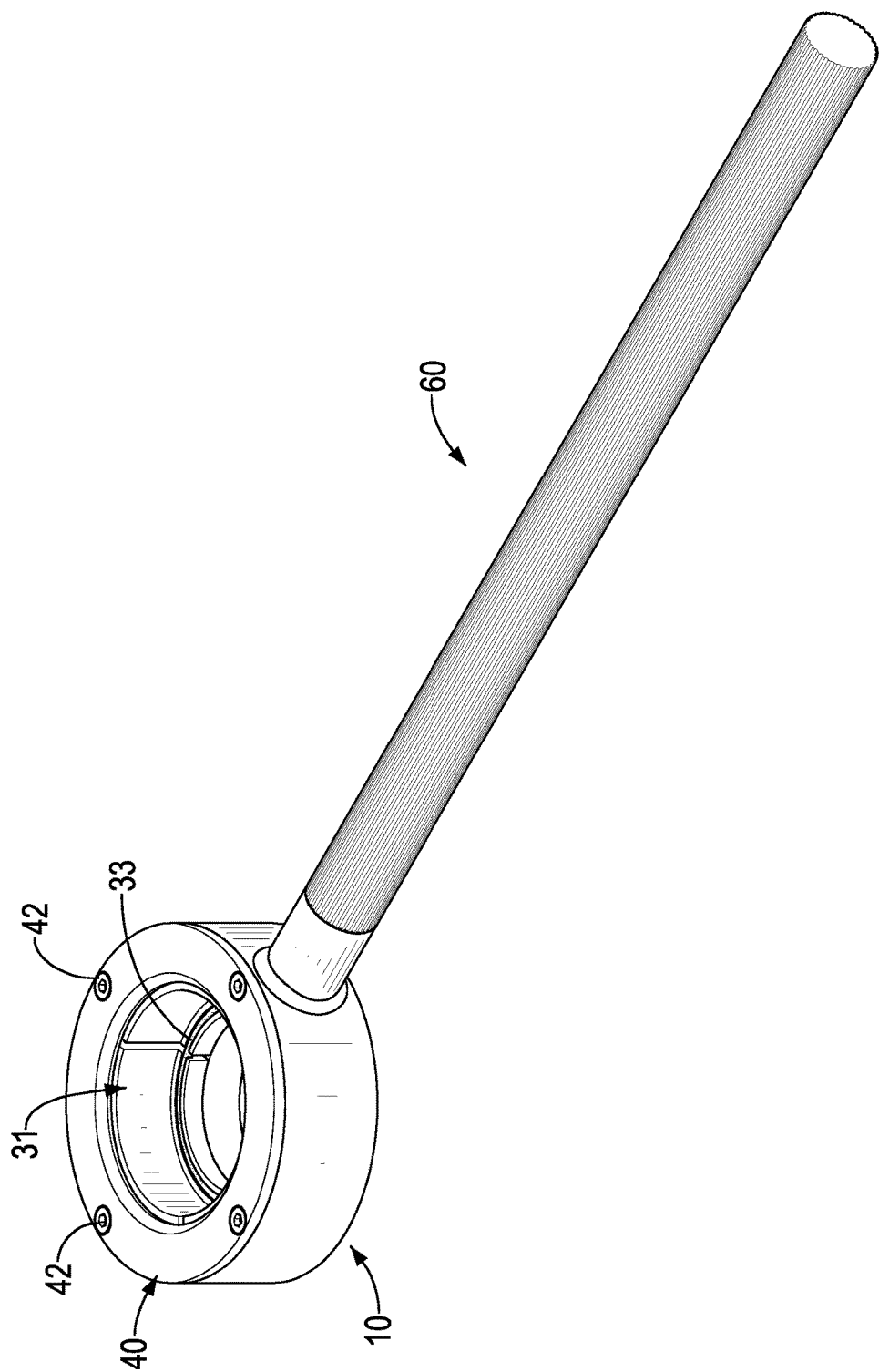
FIG. 8 is another schematic perspective view of the locking device in FIG. 1, showing the locking device connected to a handle.

With reference to FIG. 7, the locking device in accordance with the present invention may be assembled to a frame 50 of a tool holder tightening fixture. The frame 50 has a base 51, two supporting arms 52, and a pivoting seat 53. The two supporting arms 52 are erectly mounted to the base 51. The pivoting seat 53 is disposed between the two supporting arms 52 and is pivotally connected to the two supporting arms 52. The locking device in accordance with the present invention is connected to the pivoting seat 53 to form the tool holder tightening fixture. With reference to FIG. 8, the locking device in accordance with the present invention may be assembled to a handle 60. The handle 60 is connected to an exterior peripheral surface of the collar body 10 to form a fixture for fastening or loosening fasteners such as nuts or bolts.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A locking device comprising:
a collar body having
two faces facing to opposite directions;
an inner periphery;
a mounting opening defined in one of the two faces of the collar body;
an inserting opening defined in the other one of the two faces of the collar body and coaxially aligned with the mounting opening;

a chamber formed inside the collar body and communicating with the mounting opening and the inserting opening; and multiple first concave recesses formed in the inner periphery of the collar body and making the mounting opening have a corrugated outline;

a roller cage mounted in the chamber and having multiple slots respectively aligned with the multiple first concave recesses;

each one of the multiple slots having a notch disposed toward the mounting opening; and multiple rollers respectively and rotatably mounted in the multiple slots and respectively abutting the multiple first concave recesses;

a clamping set mounted in the chamber and within the roller cage;

the clamping set having multiple clamping blocks annularly disposed within the roller cage;

each one of the multiple clamping blocks being curved and having an outer peripheral surface facing to the inner periphery of the collar body; and multiple second concave recesses formed in the outer peripheral surface;

the multiple second concave recesses of the multiple clamping blocks respectively abutting the multiple rollers and making each one of the multiple rollers rotatable along a corresponding one of the multiple first concave recesses and a corresponding one of the multiple second concave recesses; and a blocking plate fastened to the collar body to retain the roller cage, the multiple rollers, and the clamping set inside the collar body;

the blocking plate having a surface abutting against the collar body, the roller cage, the multiple rollers, and the multiple clamping blocks, wherein the collar body has multiple first curved grooves annularly and separately disposed around the inserting opening and communicating with the chamber;

each one of the multiple clamping blocks has multiple radial grooves respectively extending along radial directions of the clamping block;

the clamping set has multiple first balls rotatably and respectively received in the multiple first curved grooves and multiple radial grooves of the multiple clamping blocks; and the multiple clamping blocks are rotatable around the inserting opening via the multiple first balls rotatably and respectively received in the multiple first curved grooves and the multiple radial grooves of the multiple clamping blocks.

2. The locking device as claimed in claim 1, wherein the collar body further has multiple second curved grooves annularly and separately disposed around the inserting opening, disposed aside the multiple first curved grooves, and communicating with the chamber; and the clamping set further has multiple second balls rotatably and respectively received in the multiple second curved grooves and the multiple radial grooves of the multiple clamping blocks.

3. The locking device as claimed in claim 2, wherein each one of the multiple clamping blocks has an inner peripheral surface facing opposite the outer peripheral surface of the clamping block;

an inner flange protruding inward from the inner peripheral surface of the clamping block and disposed adjacent to the inserting opening; and a receiving groove formed in the inner flange of the clamping block and facing to the mounting opening; and the multiple receiving grooves of the multiple clamping blocks are disposed annularly and retained by an O-ring to hold the multiple clamping blocks in position.

4. The locking device as claimed in claim 3, wherein the collar body has multiple threaded holes formed in one of the two faces of the collar body and disposed around the mounting opening; and multiple bolts pass through the blocking plate, are respectively screwed with the multiple threaded holes, and connect the blocking plate to the collar body.

5. The locking device as claimed in claim 4, wherein each one of the multiple slots has two concavities extending along an axial direction of the roller cage, facing each other, and being concaved according to a peripheral surface of each one of the multiple rollers to retain a corresponding one of the multiple rollers.

6. The locking device as claimed in claim 5, wherein the locking device is able to be assembled to a frame to form a tool holder tightening fixture.

7. The locking device as claimed in claim 5, wherein an exterior peripheral surface of the collar body is connected to a handle to form a fixture for fastening or loosening fasteners.

8. The locking device as claimed in claim 2, wherein the locking device is able to be assembled to a frame to form a tool holder tightening fixture.

9. The locking device as claimed in claim 2, wherein an exterior peripheral surface of the collar body is connected to a handle to form a fixture for fastening or loosening fasteners.

10. The locking device as claimed in claim 1, wherein each one of the multiple clamping blocks has an inner peripheral surface facing opposite the outer peripheral surface of the clamping block;

an inner flange protruding inward from the inner peripheral surface of the clamping block and disposed adjacent to the inserting opening; and a receiving groove formed in the inner flange of the clamping block and facing to the mounting opening; and the multiple receiving grooves of the multiple clamping blocks are disposed annularly and retained by an O-ring to hold the multiple clamping blocks in position.

11. The locking device as claimed in claim 1, wherein the locking device is able to be assembled to a frame to form a tool holder tightening fixture.

12. The locking device as claimed in claim 1, wherein an exterior peripheral surface of the collar body is connected to a handle to form a fixture for fastening or loosening fasteners.

13. A locking device comprising:

a collar body having two faces facing to opposite directions;

an inner periphery;

a mounting opening defined in one of the two faces of the collar body;

an inserting opening defined in the other one of the two faces of the collar body and coaxially aligned with the mounting opening;

a chamber formed inside the collar body and communicating with the mounting opening and the inserting opening; and multiple first concave recesses formed in the inner periphery of the collar body and making the mounting opening have a corrugated outline;

a roller cage mounted in the chamber and having multiple slots respectively aligned with the multiple first concave recesses;

each one of the multiple slots having a notch disposed toward the mounting opening; and multiple rollers respectively and rotatably mounted in the multiple slots and respectively abutting the multiple first concave recesses;

a clamping set mounted in the chamber and within the roller cage;

the clamping set having multiple clamping blocks annularly disposed within the roller cage;

each one of the multiple clamping blocks being curved and having an outer peripheral surface facing to the inner periphery of the collar body; and multiple second concave recesses formed in the outer peripheral surface;

the multiple second concave recesses of the multiple clamping blocks respectively abutting the multiple rollers and making each one of the multiple rollers rotatable along a corresponding one of the multiple first concave recesses and a corresponding one of the multiple second concave recesses; and a blocking plate fastened to the collar body to retain the roller cage, the multiple rollers, and the clamping set inside the collar body;

the blocking plate having a surface abutting against the collar body, the roller cage, the multiple rollers, and the multiple clamping blocks, wherein each one of the multiple clamping blocks has an inner peripheral surface facing opposite the outer peripheral surface of the clamping block;

an inner flange protruding inward from the inner peripheral surface of the clamping block and disposed adjacent to the inserting opening; and a receiving groove formed in the inner flange of the clamping block and facing to the mounting opening; and the multiple receiving grooves of the multiple clamping blocks are disposed annularly and received by an O-ring to hold positions of the multiple clamping blocks.

14. The locking device as claimed in claim 13, wherein the collar body has multiple threaded holes formed in one of the two faces of the collar body and disposed around the mounting opening; and multiple bolts pass through the blocking plate, are respectively screwed with the multiple threaded holes, and connect the blocking plate to the collar body.

15. The locking device as claimed in claim 14, wherein each one of the multiple slots has two concavities extending along an axial direction of the roller cage, facing each other, and being concaved according to a peripheral surface of each one of the multiple rollers to retain a corresponding one of the multiple rollers.

16. The locking device as claimed in claim 15, wherein the locking device is able to be assembled to a frame to form a tool holder tightening fixture.

17. The locking device as claimed in claim 15, wherein an exterior peripheral surface of the collar body is connected to a handle to form a fixture for fastening or loosening fasteners.

* * * * *